US012779907B2

(12) United States Patent
Katto et al.

(10) Patent No.: US 12,779,907 B2
(45) Date of Patent: Nov. 3, 2026

(54) HEAVY LOAD PNEUMATIC TIRE

(71) Applicant: BRIDGESTONE CORPORATION, Tokyo (JP)

(72) Inventors: Yudai Katto, Tokyo (JP); Kohei Hasegawa, Tokyo (JP)

(73) Assignee: BRIDGESTONE CORPORATION, Tokyo (JP)

( * ) Notice: Subject to any disclaimer, the term of this patent is extended or adjusted under 35 U.S.C. 154(b) by 244 days.

(21) Appl. No.: 18/723,081

(22) PCT Filed: Oct. 4, 2022

(86) PCT No.: PCT/JP2022/037149
§ 371 (c)(1),
(2) Date: Jun. 21, 2024

(87) PCT Pub. No.: WO2023/119789
PCT Pub. Date: Jun. 29, 2023

(65) Prior Publication Data

US 2026/0158824 A1 Jun. 11, 2026

(30) Foreign Application Priority Data

Dec. 24, 2021 (JP) ................................ 2021-210405

(51) Int. Cl.
*B60C 9/02* (2006.01)
*B60C 9/18* (2006.01)
*B60C 13/02* (2006.01)

(52) U.S. Cl.
CPC .......... *B60C 9/0292* (2013.01); *B60C 9/1835* (2013.01); *B60C 13/02* (2013.01); *B60C 2200/06* (2013.01)

(58) Field of Classification Search
CPC .................................................. B60C 9/0292
See application file for complete search history.

(56) References Cited

U.S. PATENT DOCUMENTS 4,282,918 A 8/1981 Tomoda et al.
2005/0006018 A1 1/2005 Maruoka et al.
(Continued)

FOREIGN PATENT DOCUMENTS

CN 105073449 A 11/2015
JP 04-283108 A 10/1992
(Continued)

OTHER PUBLICATIONS

International Search Report of PCT/JP2022/037149 dated Dec. 6, 2022 [PCT/ISA/210].
(Continued)

*Primary Examiner* — Adrienne C. Johnstone
(74) *Attorney, Agent, or Firm* — Sughrue Mion, PLLC

(57) ABSTRACT

A heavy load pneumatic tire includes a carcass ply and a belt layer. The carcass ply includes a first curvature change portion that is a boundary between a first segment and a second segment and whose curvature is larger than a curvature of the first segment in a cross-section, and a second curvature change portion that is a boundary between the second segment and a third segment and whose curvature is smaller than the curvature of the second segment on the cross section. The tire further includes a cushion rubber whose inner edge is located at the first curvature change portion and that is disposed between the carcass ply and the belt layer.

3 Claims, 1 Drawing Sheet

(56) References Cited

U.S. PATENT DOCUMENTS

| | | | |
|---|---|---|---|
| 2016/0009140 | A1 | 1/2016 | Ono |
| 2019/0359000 | A1 | 11/2019 | Ishikawa |
| 2020/0016934 | A1 | 1/2020 | Kagimoto |
| 2020/0189319 | A1 | 6/2020 | Kurosawa |

FOREIGN PATENT DOCUMENTS

| | | | |
|---|---|---|---|
| JP | 06-143922 | A | 5/1994 |
| JP | 09-309301 | A | 12/1997 |
| JP | 2004-161026 | A | 6/2004 |
| JP | 2009-179147 | A | 8/2009 |
| JP | 2010-006125 | A | 1/2010 |
| JP | 2016-074279 | A | 5/2016 |
| JP | 2017-95056 | A | 6/2017 |
| JP | 2018-8664 | A | 1/2018 |
| JP | 2021-138312 | A | 9/2021 |
| WO | 98/43836 | A1 | 10/1998 |

OTHER PUBLICATIONS

Extended European Search Report dated Feb. 14, 2025 from the European Patent Office in Application No. 22910515.0.
Chinese Search Report dated Nov. 4, 2025, issued in application No. 2022800849730.

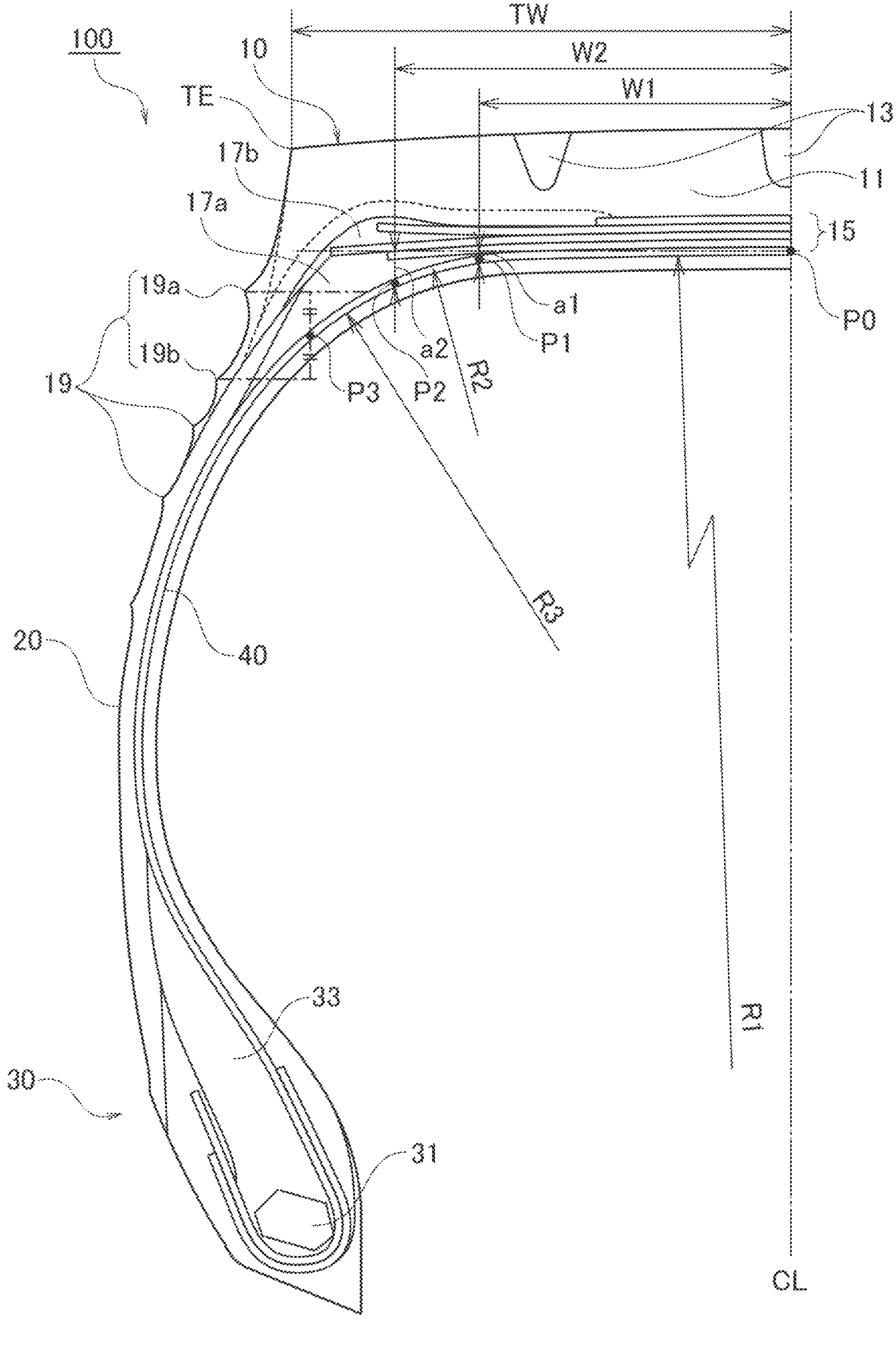
100
10
TE
TW
W2
W1
13
11
17b
17a
15
19a
19b
19
a1
P0
P1
a2
P2
P3
R2
R3
R1
20
40
33
30
31
CL

HEAVY LOAD PNEUMATIC TIRE

CROSS REFERENCE TO RELATED APPLICATIONS

This application is a National Stage of International Application No. PCT/JP2022/037149 filed on Oct. 4, 2022, claiming priority based on Japanese Patent Application No. 2021-210405 filed on Dec. 24, 2021.

TECHNICAL FIELD

The present invention relates to a heavy load pneumatic tire that includes a carcass ply having two curvature change portions where curvature changes in a tire width direction and a cushion rubber positioned between a belt layer and the carcass ply.

BACKGROUND ART

As a conventional pneumatic tire, known is a tire whose uneven wear resistance performance can be improved by optimizing a shape of a contact patch of the tire (see, Patent Literature 1, for example). In this pneumatic tire, sliding at its shoulder region with respect to a road surface during rolling of the tire is suppressed by the optimization of the contact patch shape of the tire.

For such pneumatic tires, requirements are specified based on a circumferential ground contact length of a tire in order to suppress changes of a shape of its contact patch. This configuration prevent premature uneven wear at its tread edge or its shoulder region.

CITATION LIST

Patent Literature

[Patent Literature 1]
Japanese Patent Laid-Open Publication No. H9-309301

SUMMARY OF INVENTION

Technical Problem

The above conventional pneumatic tire has a configuration in which a circumferential ground contact length of the tire is optimized even after a shape of its contact patch changes due to an increase of its travel distance (it may be referred to as growth due to an increase of a travel distance, same applies hereinafter). However, when ground pressure is secured at its shoulder end in the above configuration, the optimization of the circumferential contact length of the tire may improve its uneven wear resistance performance, but may increase thickness of a rubber layer at the shoulder region. As the result, heat generation in the shoulder region increases during rolling of the conventional pneumatic tire, and thereby its thermal degradation of the shoulder region will progress and durability of the tire may be degraded.

An object of the present invention is to provide a heavy load pneumatic tire that can suppress degradation of endurance of the tire due to heat generation in its rubber layer while improving its uneven wear resistance performance after changes of a shape of a contact patch due to an increase of a driving distance of the tire.

Solution to Problem

A heavy load pneumatic tire according to one embodiment of the present invention includes a tread section to be contacted with a ground surface, a tire side section that extends from the tread section and is located inside the tread section in a tire radial direction, a bead section that extends from the tire side section and is located inside the tire side section in the tire radial direction, a carcass ply that is mounted from the tread section through the tire side section to the bead section to form a framework of the pneumatic tire, and a belt layer that is disposed in the tread section and is located outside the carcass ply in the tire radial direction. The carcass ply includes a first curvature change portion that is a boundary between a first segment that contains a tire equator line and a second segment that is located outside the first segment in a tire width direction and inside the first segment in the tire radial direction and whose curvature is larger than a curvature of the first segment in a cross section determined by the tire width direction and the tire radial direction, and a second curvature change portion that is a boundary between the second segment and a third segment that is located inside the second segment in the tire radial direction and whose curvature is smaller than the curvature of the second segment on the cross section. The tire further comprises a cushion rubber whose inner edge in the tire width direction is located at the first curvature change portion and that is disposed between the carcass ply and the belt layer.

Advantageous Effects of Invention

In the above configuration, the curvature radius of the second portion of the carcass ply is reduced. By this configuration, a ground pressure in a vicinity of a tread edge in the tire width direction is reduced, and the ground pressure is made uniform in the tire width direction. Then, changes of a shape of a contact patch of the tire caused by growth due to an increase of a travel distance is suppressed. In addition, in this configuration, there is no need to increase a thickness of a rubber layer to optimize the shape of the contact patch. Therefore, the decrease in durability of the tire caused by an increase of heat generation in a shoulder region during rolling of the tire can also be suppressed. Furthermore, the cushion rubber is located between the belt layer and the carcass ply in the second segment. Therefore, the ground pressure in this segment in the vicinity of the tread edge can be made more uniform in the tire width direction and uneven wear can be effectively suppressed.

BRIEF DESCRIPTION OF DRAWINGS

The FIGURE is a cross-sectional view of a heavy load pneumatic tire 100 on a cross section determined by its tire width direction and its tire radial direction.

DESCRIPTION OF EMBODIMENTS

Hereinafter, an embodiment will be described based on the drawings. Note that the same functions and structures are denoted by the same or similar reference numerals, and their description will be omitted accordingly.

(1) OVERALL SCHEMATIC CONFIGURATION OF TIRE

The FIGURE is a cross-sectional view of a heavy load pneumatic tire 100 according to the present embodiment on a cross section determined by its tire width direction and its tire radial direction. Note that the FIGURE shows only one side with respect to a tire equator line CL. The configuration of the heavy load pneumatic tire 100 may be symmetrical with respect to the tire equator line CL. Cross-sectional hatchings are omitted in the FIGURE (same applies hereinafter).

A tread pattern is formed on a tread section 10 according to performance required for the tire. In the present embodiment, the tire is the heavy load pneumatic tire that can be especially suitable for trucks and buses (TB) that travel long distances.

Note that a heavy load pneumatic tires are not necessarily for trucks and buses, but may be used for other types of vehicles, such as vans and light trucks, for example.

The heavy load pneumatic tire 100 according to the one embodiment includes a tread section 10 to be contacted with a road surface, tire side sections 20, bead sections 30, a carcass ply 40, and a belt layer 15. The tire side section(s) 20 extends from the tread section 10 and is located inside the tread section 10 in the tire radial direction. The bead section(s) 30 extends from the tire side section 20 and is located inside the tire side section 20 in the tire radial direction. The carcass ply 40 is mounted from the tread section 10 through the tire side section(s) 20 to the bead section(s) 30 and forms a framework of the tire. The belt layer 15 is disposed in the tread section 10 and is located outside the carcass ply 40 in the tire radial direction.

As shown in the FIGURE, the carcass ply 40 includes a first segment P0-P1 that contains a tire equator line CL, a second segment P1-P2 that is located outside the first segment P0-P1 in the tire width direction and inside the first segment P0-P1 in the tire radial direction, and a third segment P2-P3 that is located inside the second segment P1-P2 in the tire radial direction. On the cross section determined by the tire width direction and the tire radial direction, a curvature of the second segment P1-P2 is larger than a curvature of the first segment P0-P1. A first curvature change portion P1 is defined as a boundary between the first segment P0-P1 and the second segment P1-P2 where the curvature on the cross section determined by the tire width direction and the tire radial direction changes. On the above cross section, a curvature of the third segment P2-P3 is smaller than the curvature of the second section P1-P2. The second curvature change portion P2 is defined as a boundary between the second segment P1-P2 and the third segment P2-P3 where the curvature changes on the cross section determined by the tire width direction and the tire radial direction.

The heavy load pneumatic tire 100 further includes a cushion rubber 17*a* that is disposed between the carcass ply 40 and the belt layer 15. An inner edge of the cushion rubber 17*a* in the tire width direction is located at the first curvature change portion P1.

The tread section 10 has a tread rubber 11 that includes a tread surface which is a portion to be in contact with the road surface (not shown in the FIGURES). A pattern is formed on the tread surface according to usage environment of the heavy load pneumatic tire 100 and a vehicle type to which it is mounted. In the present embodiment, as shown in the FIGURE, as an example, a pattern is illustrated in which circumferential grooves 13 extending in a circumferential direction of the tire are located on the tire equator line position CL and at positions distanced from the tire equator line CL in the tire width direction.

The tire side section 20 extends from the tread section 10 and is located inside the tread section 10 in the tire radial direction. The tire side section 20 is a side section with respect to the tread section 10, specifically an area from an outer edge of the tread section 10 in the tire width direction to an outer edge of the bead section 30 in the tire radial direction. The tire side section 20 also includes a tire side rubber. Note that the tire side section 20 is sometimes referred to as a sidewall or the like.

In a shoulder region where the tire side section 20 extends from the tread section 10, provided are plural protrusions 19 that protrude outward in the tire width direction from a tire surface and extend in a circumferential direction. The protrusions 19 have a triangular cross-sectional shape, respectively.

The bead section 30 extends from the tire side section 20 and is located inside the tire side section 20 in the tire radial direction. The bead section 30 includes a bead core 31 and a bead filler 33, and is formed to be annular. The bead filler 33 is made of rubber material and become gradually thinner from the bead core 31 outwardly in the tire radial direction.

The carcass ply 40 forms the framework of the heavy load pneumatic tire 100. The carcass ply 40 has a radial structure in which carcass cords (not shown in the FIGURES) are arranged radially along the tire radial direction. However, it is not limited for the carcass ply 40 to have a radial structure. For example, the carcass ply 40 may have a bias structure in which carcass cords are arranged to intersect in the tire radial direction. As shown in the FIGURE, the carcass ply 40 in the present embodiment is mounted from the tread section 10 through the tire side section 20 to the bead section 30. In the bead section 30, the carcass ply 40 is folded from the inside of the tire width direction to the outside of the tire width direction around the bead core 31.

The carcass cords of the carcass ply 40 may be steel cords or may have multiple plies made of organic fiber cords such as aramid, nylon, rayon, polyester, etc.

The belt layer 15 is disposed inside the tread section 10 in the tire radial direction. The belt layer 15 is located outside the carcass ply 40 in the tire radial direction in the tread section 10. The belt layer 15 includes a pair of crisscross belts whose cords are crisscross and a reinforcing belt provided outside the crisscross belts in the tire radial direction. Note that the belt layer 15 is formed by stacking multiple belts along the tire circumferential direction as shown in the FIGURE.

In addition to steel cords, organic fiber cords such as aramid, nylon, rayon, and polyester can be used as belt cords in the belt layer 15.

The cushion rubber 17*a* is disposed between the carcass ply 40 and the belt layer 15. The inner edge of the cushion rubber 17*a* in the tire width direction is located at the first curvature change portion P1.

In the present embodiment, the inner edge of the cushion rubber 17*a* in the tire width direction is located at the first curvature change portion P1, which is a position in the tire width direction where a distance in the tire radial direction between the carcass ply 40 and the belt layer 15 begins to widen. That is, the first curvature change portion P1 is the boundary where the difference in curvature between the carcass ply 40 and the belt layer 15 occurs.

An outer edge of the cushion rubber 17*a* in the tire width direction is located at an end position of the belt layer 15, which is its outermost edge in the tire width direction, or located at an outer position in the tire width direction from the end position.

The cross-sectional shape of the cushion rubber 17*a* on the cross section determined by the tire width direction and the tire radial direction is an almost triangular shape whose width in the tire radial direction increases from the center in the tire width direction toward the outer side in the tire width direction, as shown in the FIGURE. In the present embodiment, lower and upper ends of the cushion rubber 17*a* in the radial direction are in contact with the carcass ply 40 and the belt layer 15, respectively.

The cushion rubber 17*a* may be made of soft cross-linked rubber, for example. The cushion rubber 17*a* absorbs stresses generated near the edge of the belt layer 15, and thereby suppresses uneven wear near a tread edge TE while suppressing damage to the tread section 10 starting from the edge of the belt layer 15. An elastic modulus of the soft cross-linked rubber that forms the cushion rubber 17*a* may be 1.0 to 4.5 MPa.

The tread edge TE is the outermost position in the tire width direction of the surface where the tread section 10 contacts the road surface. For example, the tread edge TE may be determined based on the ground contact edge of the tread section 10 in a state where the heavy load pneumatic tire 100 to which a regulated internal pressure is applied and to which a regulated load are loaded is contacted with the flat ground surface with a camber angle of 0 degrees.

Here, the regulated internal pressure is an air pressure corresponding to the maximum load capacity in a Year Book of the JATMA (Japan Automobile Tyre Manufacturers Association, Inc) in Japan. The regulated load is the maximum load capacity (maximum load) corresponding to the maximum load capacity (load index) in the Year Book of the JATMA. In addition, it corresponds to the ETRTO in Europe, to the TRA in the U.S., and to other tire standards in other countries.

In the present embodiment, a second cushion rubber 17*b* is also disposed outside in the tire radial direction. The second cushion rubber 17*b* covers the outer edge of the belt layer 15 in the tire width direction. The second cushion rubber 17*b* covers the outer edge of the belt layer 15 in the tire width direction and contacts the cushion rubber 17*a* disposed outside in the tire width direction and inside in the tire radial direction. This configuration prevents separation of a ply edge in the heavy load pneumatic tire 100.

The heavy load pneumatic tire 100 is assembled so that the bead section 30 is engaged with a rim flange (not shown in the FIGURES) of a rim wheel. An internal space formed by the assembly to the rim wheel is filled with air. However, gas filled into the internal space is not limited to air, but may also be inert gas such as nitrogen gas.

(2) PROFILE OF CARCASS PLY

Next, a profile of the carcass ply 40 is described. As shown in the FIGURE, on the cross section determined by the tire width direction and the tire radial direction, the carcass ply 40 has the first curvature change portion P1, where the curvature of the carcass ply 40 differs between its inside and outside in the tire width direction, at its own portion determined by a distance W1 from the equator line CL in the tire width direction. Furthermore, the carcass ply 40 has the second curvature change portion P2 located between the first curvature change portion P1 and the tread edge TE of the tread section 10, where the curvature of the carcass ply 40 differs between its inside and outside in the tire width direction, at its own portion determined by a distance W2 from the equator line CL in the tire width direction.

That is, the carcass ply 40 has the first segment P0-P1 containing the tire equator line CL, which is the segment of the carcass ply 40 between the point P0 on the tire equator line CL and the first curvature change portion P1, as shown in the FIGURE. In the first segment P0-P1, the carcass ply 40 is curved with a curvature radius R1. The carcass ply 40 has the second segment P1-P2 between the first curvature change portion P1 and the second curvature change portion P2. The second segment P1-P2 is located outside the first segment P0-P1 in the tire width direction and inside the first segment P0-P1 in the tire radial direction. In the second segment P1-P2, the carcass ply 40 is curved with a curvature radius R2 smaller than the curvature radius R1 of the first segment P0-P1. That is, the first curvature change portion P1 is the boundary between the first segment P0-P1 and the second segment P1-P2 whose curvature is larger than that of the first segment P0-P1 on the cross section determined by the tire width direction and the tire radial direction. The carcass ply 40 has a larger curvature outside the first curvature change portion P1 in the tire width direction.

The carcass ply 40 has the third segment P2-P3 located inside the second curvature change portion P2 in the tire radial direction. In the third segment P2-P3, the carcass ply 40 is curved with a curvature radius R3 larger than the curvature radius R2 of the second segment P1-P2. That is, the second curvature change portion P2 is the boundary between the second segment P1-P2 and the third segment P2-P3 whose curvature is smaller than that of the second segment P1-P2 on the cross section determined by the tire width direction and tire radial direction. The carcass ply 40 has a smaller curvature inside the second curvature change portion P2 in the tire radial direction.

The cross-sectional shape of the carcass ply 40 may satisfy a relational expression 1: $0.5 \leq W1/TW \leq 0.8$ and a relation expression 2: $W1/TW < W2/TW < 1$. Here, the cross section for regulating the cross-sectional shape of the carcass ply 40 is the cross section, determined by the tire width direction and the tire radial direction, of the heavy load pneumatic tire 100, which is mounted on a regulated rim (not shown in the FIGURES), to which the regulated internal pressure is applied, and to which no load is applied. The sign W1 is the distance in the tire width direction from the tire equator line CL to the first curvature change portion P1. The sign W2 is the distance in the tire width direction from the tire equator line CL to the second curvature change portion P2. The sign TW is a distance in the tire width direction from the tire equator line CL to the tread edge TE.

Here, the regulated rim is a rim wheel that corresponds to the standard rim in the Year Book of the JATMA (Japan Automobile Tyre Manufacturers Association, Inc.) in Japan. In addition, it corresponds to the ETRTO in Europe, to the TRA in the U.S., and to other tire standards in other countries.

The cross-sectional shape of the carcass ply 40 may further satisfy a relational expression 3: $a1/W1 \leq 0.06 < a2/W2 \leq 0.15$. Here, the sign a1 is a distance in the tire radial direction from a height position of the carcass ply 40 on the tire equator line CL to a height position of the first curvature change portion P1. The sign a2 is a distance in the tire radial direction from the height position of the carcass ply 40 on the tire equator line CL to a height position of the second curvature change portion P2.

Note that the cross section of the carcass ply 40 determined by the tire width direction and the tire radial direction has a cross-sectional shape that intersects the tire equator line CL and smoothly passes through the position P0, the first curvature change portion P1 and the second curvature change portion P2 on the carcass ply 40.

Here, the curvature radius R1 of the first segment P0-P1 is a curvature radius of the cross-sectional shape of the carcass ply 40 between the position P0 on the tire equator line CL and the first curvature change portion P1. The curvature radius R2 of the second segment P1-P2 is a curvature radius of the cross-sectional shape of the carcass ply 40 between the first segment P1 and the second segment P2. The cross-sectional shape of the carcass ply 40 is a shape that smoothly passes through the three points of the position P0, the first curvature change portion P1 and the second curvature change portion P2. Furthermore, the cross-sectional shape of the carcass ply 40 is determined so as to satisfy the relational expressions 1 and 2. According to this configuration, the range of possible curvature radii R1 and R2 of the first segment P0-P1 and the second segment P1-P2 of the carcass ply 40 is determined. Note that the range of possible curvature radii R1 and R2 may be defined as the range satisfying not only the relational expressions 1 and 2 but also the relational expression 3.

The cross-sectional shape of the carcass ply 40 may satisfy a relational expression 4: $R2/R3 \leq 0.5$. Here, the sign R3 is a curvature radius of the cross-sectional shape of the carcass ply 40 (the third segment P2-P3) between the second curvature change portion P2 and the portion P3 located inside the area where the plural protrusions 19 formed on the tire surface are located in the tire width direction. Note that, in the carcass ply 40, the radial position of the portion P3, which is the inner edge of the third segment P2-P3 in the tire radial direction, may be set at a middle position between a radial position of the first protrusion 19*a*, which is located at the outer end in the tire radial direction among the plural protrusions 19, and a radial position of the second protrusion 19*b* adjacent to the first protrusion 19*a*. In the present embodiment, as shown in the FIGURE, the portion P3 is located at a radial position that is a midpoint (the center position in the tire radial direction) between the radial position of the first protrusion 19*a* and the radial position of the second protrusion 19*b*.

(3) FUNCTIONS AND ADVANTAGES

Generally, in heavy load tires for trucks and buses, its circumferential ground contact length in a vicinity of the tread edge is shorter than its circumferential ground contact length in a range from the tire equator line to a position inside the vicinity of the tread edge in the tire width direction. Therefore, in heavy load tires for trucks and buses, its ground pressure in the vicinity of the tread edge is relatively lower than its ground pressure in the range containing the tire equator line. In this case, the vicinity of the tread edge is dragged when the tire rolls, and abnormal wear such as stepped wear, in which the vicinity of the tread edge wears in a stepped shape, may occur. Even when the tire is used under conditions where such stepped wear is suppressed, the circumferential ground contact length changes as the travel distance of the tire increases. Specifically, an intermediate portion between the tire equator line and the vicinity of the tread edge grows relatively large as the travel distance increases and the circumferential ground contact length at the intermediate portion becomes longer. As a result, the ground pressure in the vicinity of the tread edge becomes relatively lower than that at the intermediate portion, which may cause uneven wear.

In the heavy load pneumatic tire 100 according to the present embodiment, the carcass ply 40 includes the first segment P0-P1 containing the tire equator line CL, the second segment P1-P2 located outside the first segment P0-P1 in the tire width direction and inside the first segment P0-P1 in the tire radial direction, and the third segment P2-P3 located inside the second segment P1-P2 in the tire radial direction. The curvature of the second segment P1-P2 is larger than the curvature of the first segment P0-P1 on the cross section determined by the tire width direction and the tire radial direction. The first segment P1 is defined as the boundary between the first segment P0-P1 and the second segment P1-P2 where the curvature changes on the cross section determined by the tire width direction and the tire radial direction. The curvature of the third segment P2-P3 is smaller than the curvature of the second segment P1-P2 on the above cross section. The second curvature changing portion P2 is defined as the boundary between the second segment P1-P2 and the third segment P2-P3 where the curvature changes on the cross section determined by the tire width direction and the tire radial direction. That is, the curvature radius R1 of the first segment P0-P1 is larger than that of the second segment P1-P2. And the curvature radius R2 of the second segment P1-P2 is smaller than the curvature radius R3 of the third segment P2-P3.

The growth, due to increase of the traveling distance, caused by the internal pressure of the tire is promoted in the areas where the curvature radius is relatively large (the first segment P0-P1 and the third segment P2-P3) and is suppressed in the area where the curvature radius is relatively small (the second segment P1-P2). Therefore, excessive growth due to increase of the traveling distance is suppressed at the intermediate portion between the tire equator line CL and the vicinity of the tread edge TE where the second segment P1-P2 is included. Therefore, in the heavy load pneumatic tire 100 according to the present embodiment, the circumferential ground contact length can be optimized along the tire width direction without increasing the thickness of the rubber layer in the vicinity of the tread end TE (the shoulder region). In other words, according to the present embodiment of the heavy load pneumatic tire 100, degradation of endurance performance of the tire due to heat generation of the rubber layer can be suppressed while improving uneven wear resistance performance after the growth due to increase of the traveling distance.

Furthermore, the heavy load pneumatic tire 100 according to the present embodiment includes the cushion rubber 17*a* disposed between the carcass ply 40 and the belt layer 15. The inner edge of the cushion rubber 17*a* in the tire width direction is located at the first curvature change portion P1.

The cushion rubber 17*a* is disposed outside the first curvature change portion P1 in the tire width direction, specifically, disposed at least at a part of the second segment P1-P2. As a result, the ground pressure is further reduced at the position where the cushion rubber 17*a* is disposed within the above-mentioned intermediate portion. Therefore, uneven wear, which is caused by dragging the vicinity of the tread edge TE during rolling of the tire, can be further suppressed.

In addition, as shown in the FIGURE, in a case where the outer edge in the tire width direction of a radially outer portion of the cushion rubber 17*a* reaches the outer edge of the belt layer 15 in the tire width direction, the movement of the outer edge of the belt layer 15 in the tire width direction can be suppressed and thereby the rubber layer(s) in its vicinity can be prevented from being damaged.

In addition, in case where the cross-sectional shape of the carcass ply 40 of the heavy load tire 100 for trucks and buses satisfies the relational expression $0.5 \leq W1/TW \leq 0.8$ and the relational expression $W1/TW < W2/TW < 1$, it becomes possible to effectively suppress the growth due to increase of the traveling distance at inner portions, in the tire width direction, of shoulder land blocks adjacent to the tread edge TE. Here, the cross-sectional shape of the 40 carcass ply is a cross-sectional shape of the heavy load pneumatic tire, which is mounted on the regulated rim, to which the regulated inner pressure is applied, and to which no load is applied, on the above-mentioned cross section.

In addition, the distance in the tire radial direction from the height position in the tire radial direction of the carcass ply 40 at the position (P0) of the tire equator line CL to the height position in the tire radial direction of the first curvature change portion P1 is denoted as a1. And the distance in the tire radial direction from the height position in the tire radial direction of the carcass ply 40 at the position (P0) of the tire equator line CL to the height position in the tire radial direction of the second curvature change portion P2 is denoted as a2. Here, in a case where the above-mentioned cross-sectional shape further satisfies the relational expression $a1/W1 \leq 0.06 \leq a2/W2 \leq 0.15$, the ground pressure from the tire equator line CL to the tread edge TE of the heavy load tire 100 for trucks and buses can be made more uniform in the tire width direction.

In addition, in the heavy load pneumatic tire 100 according to the present embodiment, the plural protrusions 19 that protrude outward in the tire width direction from the tire surface and extend in the circumferential direction are formed on the tire surface in the shoulder region where the tire side section 20 extends from the tread section 10. On the above-mentioned cross section, the curvature radius R2 of the second segment (P1-P2) of the carcass ply 40 and the curvature radius R3 of the carcass ply 40 located between the second curvature change portion P2 and the portion P3 located inside the tire width direction of the area where the plural protrusions 19 of the carcass ply 40 are provided are When the relational formula $R2/R3 \leq 0.5$ is satisfied, ground pressure at the tread edge TE can be secured more reliably. Therefore, the uneven wear resistance of the heavy load pneumatic tire 100 in the width direction of the tire can be improved.

(4) EXAMPLES

To confirm the advantages of the invention, estimated are uneven wear resistance performance and endurance performance against heat generation of heavy load pneumatic tires for buses and trucks having a basic structure shown in the FIGURE and a size 11R22.5, based on specifications in a Table 1. Their tread patterns are identical. They are substantially identical except for parameters shown in Table 1. Among them, only the tire 1 is prototyped and its performances are tested. With respect to the tires 2 through 4, performances are estimated based on actual measurements of shapes of their contact patches.

TABLE 1

| | OPTIMIZATION OF GROUND CONTACT LENGTH | TW (mm) | a1 (mm) | a2 (mm) | W1 (mm) | W2 (mm) | R2 (mm) | R3 (mm) |
|---|---|---|---|---|---|---|---|---|
| TIRE 1 | NOT APPLIED | 107.5 | 4.5 | 18 | 68 | 100 | 100 | 90 |
| TIRE 2 | APPLIED | | | | | | | |
| TIRE 3 | NOT APPLIED | | 3 | 10.5 | 60 | 82 | 80 | 280 |
| TIRE 4 | APPLIED | | | | | | | |

With respect to the heavy load tires as the Examples, the tire 1 is a tire that uses a conventional case line and its circumferential ground contact length is not yet optimized. The tire 2 is a tire that uses a conventional case line but its circumferential ground contact length at a ground contact end, when it is brand-new, is elongated by a thickness of a rubber layer. The tire 3 is a tire that includes a case line of the present embodiment but its circumferential ground contact length is not yet optimized. The tire 4 is a tire that includes a case line of the present embodiment and its circumferential ground contact length at a ground contact end, when it is brand-new, is elongated by a thickness of a rubber layer.

Note that dimensions of a carcass profile of each tire of the Examples shown in the Table 1 are measured values obtained by CT scan under a regulated condition after they are mounted on a rim shown below.

Rim: 8.25×22.5

A method for estimating the heavy load tires is explained below.

<Uneven Wear Resistance Performance>

Each tire of the Examples is installed to all wheels of a vehicle under conditions of rim (8.25×22.5), internal pressure (775 kPa), and load (25.80 kN), and road tests are done at actual use speed to estimate occurrence of shoulder drop wear at its shoulder region until 50% worn. The tire 1 has an issue with its uneven wear. Therefore, as an index of judgment criteria, when the amount of shoulder drop wear of the tire 1 is set to 1, "A" (excellent) is evaluated as 0.6 or less, "B" (good) as 0.8 or less, "C" (acceptable) as 1 or less, and "D" (not acceptable) as 1 or more.

<Endurance Performance Against Heat Generation>

The above-mentioned vehicle is used and driven at 90 km/hr until a failure occurs, and estimation is made based on a time unlit the failure occurs. The endurance performance against heat generation of the tire 1 fully satisfies the market requirements. Therefore, as an index of judgment criteria, when the driving time until the failure of the tire 1 occurs is set as 1, "A" (excellent) is evaluated as 1 or more, "B" (good) as 0.8 or more, "C" (acceptable) as 0.6 or more, and "D" (not acceptable) as less than 0.6.

TABLE 2

| | UNEVEN WEAR RESISTANCE PERFORMANCE | ENDURANCE PERFORMANCE AGAINST HEAT GENERATION |
|---|---|---|
| TIRE 1 | C | A |
| TIRE 2 | A | C |
| TIRE 3 | B | A |
| TIRE 4 | A | B |

As shown in a Table 2, it is difficult to obtain high ratings for both of the uneven wear resistance performance and the endurance performance against heat generation for the tires 1 and 2 with a conventional case line. On the other hand, the tires 3 and 4 with a case lines that satisfies the conditions of the present embodiment can achieve both of the uneven wear resistance performance and the endurance performance against heat generation.

Entire contents of a Japanese Patent Application No. 2021-210405 (filed on Dec. 24, 2021) are incorporate herein.

Although the embodiment of the present invention is described above, the descriptions and the drawings that form part of this disclosure should not be understood as limiting the invention. Various alternative embodiments, examples, and operational techniques will be apparent to those skilled in the art from this disclosure.

The invention claimed is:

1. A heavy load pneumatic tire comprising:

a tread section to be contacted with a ground surface;

a tire side section that extends from the tread section and is located inside the tread section in a tire radial direction;

a bead section that extends from the tire side section and is located inside the tire side section in the tire radial direction;

a carcass ply that is mounted from the tread section through the tire side section to the bead section to form a framework of the pneumatic tire; and a belt layer that is disposed in the tread section and is located outside the carcass ply in the tire radial direction, wherein in a state where no load is applied to the tire while the tire is mounted on a regulated rim and a regulated inner pressure is applied to the tire the carcass ply includes a first curvature change portion that is a boundary between a first segment that contains a tire equator line and a second segment that is located outside the first segment in a tire width direction and inside the first segment in the tire radial direction and whose curvature is larger than a curvature of the first segment in a cross section determined by the tire width direction and the tire radial direction, and a second curvature change portion that is a boundary between the second segment and a third segment that is located inside the second segment in the tire radial direction and whose curvature is smaller than the curvature of the second segment on the cross section, wherein the tire further comprises a cushion rubber whose inner edge in the tire width direction is located at the first curvature change portion and that is disposed between the carcass ply and the belt layer, and wherein, a shape of the heavy load pneumatic tire on the cross-section satisfies a relational expression $0.5 \leq W1/TW \leq 0.8$ and a relational expression $W1/TW \leq W2/TW < 1$, W1 denoting a distance in the tire width direction between the tire equator line and the first curvature change portion, W2 denoting a distance in the tire width direction between the tire equator line and the second curvature change portion, and TW denoting a distance in the tire width direction between the tire equator line and a tread edge of the tread section.

2. The heavy load pneumatic tire according to claim 1, wherein a relational expression $a1/W1 \leq 0.06 \leq a2/W2 \leq 0.15$ is satisfied, a1 denoting a distance in the tire radial direction between a position of the carcass ply in the tire radial direction on the tire equator line and a position of the first curvature change portion in the tire radial direction, and a2 denoting a distance in the tire radial direction between a position of the carcass ply in the tire radial direction on the tire equator line and a position of the second curvature change portion in the tire radial direction.

3. The heavy load pneumatic tire according to claim 1, wherein a plurality of protrusions is provided on a tire surface in a shoulder region where the tire side section extends from the tread section, the protrusions protruding outward from the tire surface in the tire width direction and extending in a tire circumferential direction, wherein the plurality of protrusions includes a first protrusion located at an outer end in the tire radial direction and a second protrusion adjacent to the first protrusion, and wherein a curvature radius R2 of the second segment and a curvature radius R3 of the third segment satisfy a relational expression $R2/R3 \leq 0.5$ on the cross-section, the second segment being segmented between the first curvature change portion and the second curvature change portion and the third segment being segmented between the second curvature change portion and a midpoint on the carcass ply in the tire radial direction between the first protrusion and the second protrusion.

* * * * *